April 18, 1933.  Z. STARKS  1,904,700
PROTECTOR FOR PLANTS
Filed July 20, 1931
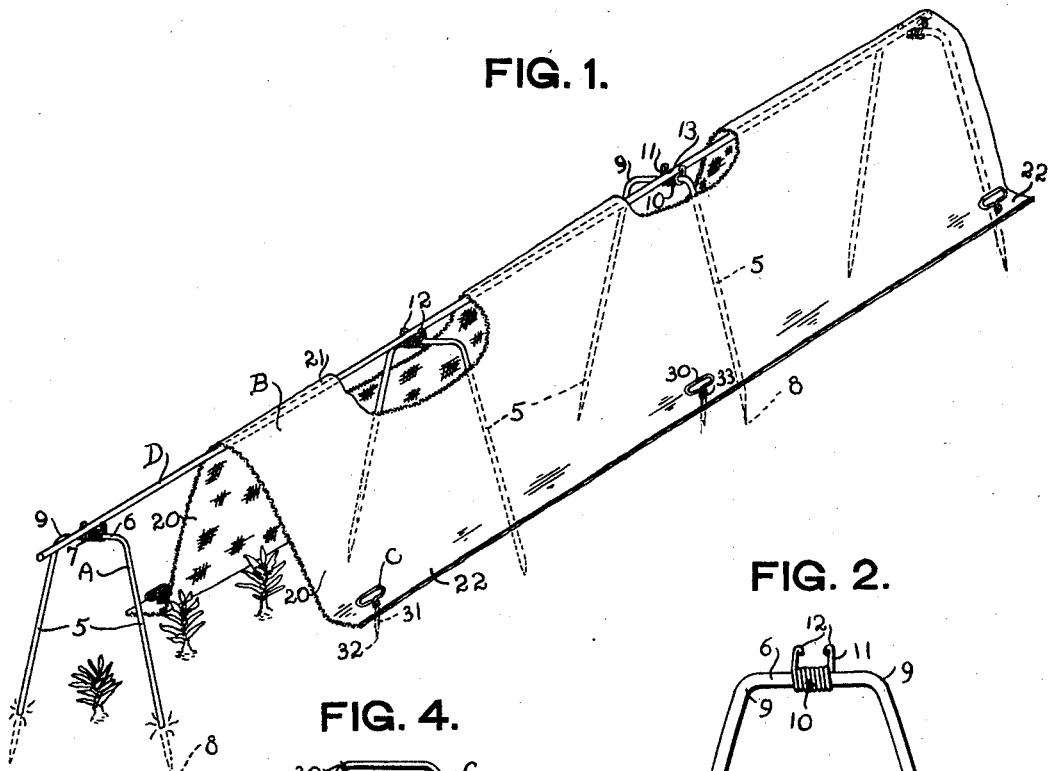
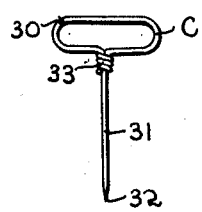
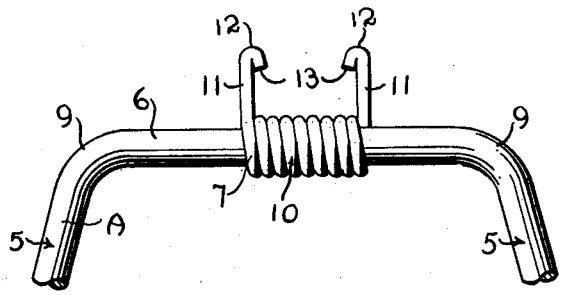
INVENTOR.
Zeston Starks
BY Lancaster, Allwine and Rommel
ATTORNEYS.

Patented Apr. 18, 1933

1,904,700

UNITED STATES PATENT OFFICE

ZESTON STARKS, OF MALVERN, OHIO

PROTECTOR FOR PLANTS

Application filed July 20, 1931. Serial No. 552,034.

This invention relates to plant protectors, or devices for shielding and sheltering growing plants and their fruits and flowers from the sun, rain, frost, hail, wind, insect enemies, bird and the like.

An object of this invention is to provide a plant protector having supports which require no spaced apart holes or openings to be made in the protective covering in order to apply it.

Another object is to provide a plant protector in which the covering is not secured to any part of the support and may be stretched beyond the support legs so as to cover more ground than would be possible if it were fixed to the legs.

Another object is to provide a plant protector in which the supports may be spaced evenly or unevenly and may align or fail to align one with another and still provide efficient support for the protective covering.

Still another object is to provide a plant protector support which will permit the user to cut and fit the covering material according to the particular requirements encountered, so that it is not necessary to have various sizes of covering material on hand to fit the support.

Another object is to provide a plant protector in which the ridge poles may be supplied by the purchaser of the support and may be poles, rods, laths or the like and of varying width without detracting from the efficiency of the device.

Yet another object is to provide a plant protector which is inexpensive to manufacture and which may be packed, shipped and stored so as to take up but little room.

Other objects and advantages of the invention will be apparent during the course of the following detailed description, taken in connection with the accompanying drawing forming a part of this specification and in which drawing:—

Figure 1 is a perspective view showing the improved plant protector in use.

Figure 2 is a front elevation of the protector support.

Figure 3 is an enlarged fragmentary side elevation of the upper portion of the support.

Figure 4 is a front elevation of the protector covering hold down means.

In the drawing wherein like reference characters designate corresponding parts thruout the several views the letter A may designate generally the support, B the protective covering therefor, C the covering hold down means and D the ridge pole.

The support A preferably comprises an inverted U-shaped body having leg portions 5 and a bight portion or substantially horizontal extension 6 upon which is a spring clip or jaw portion 7. The support, including the spring clip, is preferably constructed of two lengths of wire one of heavy wire forming the leg and bight portions and the other of lighter resilient wire forming the clip. The leg portions 5 are pointed as at 8 at their free ends and the legs spread outwardly from the bight portion 6 as shown in Figure 2. It is preferred that the bight portion be straight except at its ends where they merge into the legs and at this portion they are arcuated as at 9. The spring clip 7 as stated above is preferably constructed of a single length of resilient wire bent to form a coil spring 10 of an inner circumference such as to tightly grip the bight portions 6 of the support. The spring 10 is, however, considerably smaller in length than the bight portion and while it should tightly grip the bight portion so that it will not rotate about the bight portion, it can be slid along this portion as required. The ends of the spring form arms 11 paralleling each other and outwardly projecting from the circumference of the spring and their extremities are bent over inwardly of the spring so as to present rounded heads 12 and form abutments 13 as clearly shown in Figure 3. Thus a ridge-pole receiving socket is formed.

As to the plant protector covering B, this may comprise lengths of any flexible material such as canvas, burlap, cloth or the like treated so as to render it transparent, heavy paper and netting. When adjusted on the support it will present sloping faces 20, a ridge pole covering portion 21 and ground engaging portions 22.

The covering hold down means or pegs C preferably comprises a single length of wire bent to form a handle portion 30 and a shank portion 31 the end of the wire forming the shank being pointed as at 32 and the opposite end of the wire being twisted as at 33 or otherwise secured at the base of the handle. The handle portion should be looped or bent so as to form an elongated open handle portion.

The ridge pole D may comprise an elongated rod, but the user of the device may employ a pole or the like such as are generally available on farms and in wood lots.

When employing the device, the user sets the supports by inserting the pointed ends of the legs into the ground, spacing the supports apart such distances as the lay of the ground and its condition affords. It is not necessary that they be evenly spaced nor that they align one with another. Neither is it necessary that the widest part of the support be as wide as the plant to be protected. Next, the user lays the ridge pole in place by inserting it between the arms of each spring clip. If some supports are unevenly placed, so that they do not align, or the ridge pole be a pole cut from the woods and not wholly straight, the clips may be moved along the bight portions so as to engage the pole, as is well illustrated in Figure 1. So that the clips may not grip the support when being moved along it, the front end portion of a finger and the thumb may be pressed against the arms 11 and the thumb and finger spread apart, so that the arms will move away from each other and relieve somewhat the spring tension. It is apparent that wide ridge poles, such as laths or the like or poles cut from the woods, which taper in length, will be as efficiently accommodated by the clips since the springs will permit the arms to move apart enough to take care of these differences. The rounded heads 11 aid when pressing the ridge pole between the arms and the abutments 12 aid in holding the ridge pole when in place. It can be seen that the clips may be removed from or replaced on the support body, for the coil spring will slide along the rounded portions 9 of the bight and down or up the legs.

When the ridge poles are in place the plant protector covering is laid over the ridge poles and bight portions and down over the legs. If the plants are not large, the covering may lay against the legs and be pegged down at convenient intervals by punching the shank of the protective covering hold down means thru the ground engaging portions of the covering and into the ground. The elongated handle of the covering hold down means when in contact with the protective covering prevents it from tearing out of the hole made by the shank. If the plants are larger than the width of the support the covering may be stretched away from the legs as far as necessary and pegged down as before. Since any width covering can be used, so as to extend outwardly along the ground as shown in Figure 1 small animals, birds, etc., will not be apt to find places where they can crawl under the covering as might be the case if the covering extended only to the ground. Since there are absolutely no parts of the support projecting thru the covering, no holes in the latter are necessary other than those made by the shank of the covering hold down means, for moisture, insects, etc., to find egress or to be torn by the wind.

When dismantling the protector, the pegs are withdrawn, the covering rolled up or otherwise compacted, the ridge poles withdrawn and stored or thrown away and the supports pulled up. The pegs and supports may be stored in a very small space by placing a number of supports together and slipping the elongated handles of several of the covering hold down means over the legs or bight portions.

Changes in detail may be made to the form of invention herein shown and described, without departing from the spirit of the invention or the scope of the following claims.

What is claimed is:

1. In a plant protector the combination of a support, a spring clip carried by said support, a ridge pole removably carried by said clip, and a plant protector covering supported by said support and ridge pole.

2. In a plant protector, the combination of a support, a spring clip carried by said support, a ridge pole removably carried by said clip, and a plant protector covering supported by said support and ridge pole and covering said clip.

3. In a plant protector, the combination of a wire support comprising legs and a bight portion and a wire clip carried by said bight portion, a ridge pole removably carried by said clip, and a plant protector covering supported by said support and ridge pole.

4. As an article of manufacture a plant protector covering support, comprising a leg portion and a substantially horizontal extension at the upper end thereof provided with a ridge pole receiving clip.

5. A plant protector covering support comprising a leg portion, a substantially horizontal extension at the upper end thereof and a ridge pole receiving clip slidably carried by said extension.

6. A plant protector covering support comprising a leg portion, a substantially horizontal extension at the upper end thereof and a ridge pole receiving clip adjustable on said extension.

7. A plant protector covering support comprising a leg portion, a substantially horizontal extension at the upper end thereof and a ridge pole receiving member carried by the extension, provided with arms for embracing the ridge pole.

8. A plant protector covering support comprising a leg portion, a substantially horizontal extension at the upper end thereof, and a ridge pole receiving member having a coil spring body encircling said extension, the ends of said coil spring body forming arms adapted to embrace the ridge pole.

9. A plant protector covering support comprising a single length of wire bent to form an inverted U-shaped body and a single length of wire bent to form a coil spring and ridge pole embracing arms, at either end of said spring, carried by the bight portion of said inverted U-shaped body.

10. A plant protector covering support comprising an inverted U-shaped body of substantially circular cross section, and a coil spring having upwardly extending arms at the ends thereof, said spring encircling a portion of the bight portion of said inverted U-shaped body and slidable thereon and said arms adapted to embrace the ridge pole.

11. As an article of manufacture a ridge pole receiving clip for a plant protector covering support comprising a single length of wire bent to form a coil spring adapted to encircle the support, and further bent to form outwardly extending parallel arms at the ends of said coil spring, said arms having their ends bent inwardly towards said coil spring and adapted to embrace and hold the ridge pole.

12. As an article of manufacture a ridge pole receiving clip for a plant protector covering support, comprising a single length of wire bent to form a coil spring adapted to encircle the support, and further bent to form outwardly extending parallel arms at the ends of said coil spring, having rounded ends and abutments facing said coil spring, said arms and abutments adapted to hold the ridge pole.

13. A plant protector covering support comprising a leg portion and a substantially horizontal extension at the upper end thereof provided with a ridge-pole receiving socket with the mouth of the socket facing upwardly.

ZESTON STARKS.